United States Patent
Wakano

(10) Patent No.: US 10,384,314 B2
(45) Date of Patent: Aug. 20, 2019

(54) METAL PARTICLE AND METHOD FOR PRODUCING THE SAME, COVERED METAL PARTICLE, AND METAL POWDER

(71) Applicant: HITACHI METALS, LTD, Minato-ku, Tokyo (JP)

(72) Inventor: Motoki Wakano, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/303,832

(22) PCT Filed: Mar. 23, 2016

(86) PCT No.: PCT/JP2016/059248
§ 371 (c)(1),
(2) Date: Oct. 13, 2016

(87) PCT Pub. No.: WO2016/170904
PCT Pub. Date: Oct. 27, 2016

(65) Prior Publication Data
US 2018/0056451 A1   Mar. 1, 2018

(30) Foreign Application Priority Data

Apr. 22, 2015   (JP) .................................. 2015-087800

(51) Int. Cl.
*B23K 35/00*   (2006.01)
*B23K 35/30*   (2006.01)
(Continued)

(52) U.S. Cl.
CPC .............. *B23K 35/302* (2013.01); *B22F 1/02* (2013.01); *B22F 1/025* (2013.01); *B22F 9/08* (2013.01);
(Continued)

(58) Field of Classification Search
CPC .... B23K 35/302; B23K 35/0244; C25D 3/60; C25D 5/34; C25D 3/12; B22F 9/08; B22F 1/025; B22F 2301/10
(Continued)

(56) References Cited

U.S. PATENT DOCUMENTS 4,778,517 A * 10/1988 Kopatz ................. B22F 1/0048
264/10
4,818,283 A *  4/1989 Grunthaler ......... B23K 35/0205
148/411
(Continued)

FOREIGN PATENT DOCUMENTS

CN   102665972   9/2012
CN   103295993   9/2013
(Continued)

OTHER PUBLICATIONS

Lim et al. "Application of glow discharge mass spectometry for direct trace impurity analysis in Cu films" 2004.*
(Continued)

*Primary Examiner* — Kiley S Stoner
(74) *Attorney, Agent, or Firm* — Nixon Peabody LLP; Jeffrey L. Costellia

(57) ABSTRACT

A metal particle having a particle diameter of 10 μm or more and 1000 μm or less and includes Cu and trace elements and a total mass content of P and S, among other trace elements, is 3 ppm or more and 30 ppm or less. A method for producing a metal particle including producing a molten metal material by melting a metal material in a crucible, wherein Cu as determined in GDMS analysis is over 99.995% and a total of P and S is 3 ppm or more and 30 ppm or less; applying a pressure of 0.05 MPa or more and 1.0 MPa or less to drip the molten metal material through an orifice, thereby producing a molten metal droplet; and
(Continued)

rapidly solidifying the molten metal droplet using an inert gas whose oxygen concentration is 1000 ppm or less.

3 Claims, 4 Drawing Sheets

(51) Int. Cl.
*B22F 1/02* (2006.01)
*B22F 9/08* (2006.01)
*C22C 9/00* (2006.01)
*B23K 35/02* (2006.01)
*C25D 3/12* (2006.01)
*C25D 3/60* (2006.01)
*C25D 5/34* (2006.01)
*C25D 5/12* (2006.01)
*C25D 7/00* (2006.01)
*C25D 17/16* (2006.01)
*C23C 18/54* (2006.01)

(52) U.S. Cl.
CPC .......... *B22F 9/082* (2013.01); *B23K 35/0244* (2013.01); *C22C 9/00* (2013.01); *C23C 18/54* (2013.01); *C25D 3/12* (2013.01); *C25D 3/60* (2013.01); *C25D 5/12* (2013.01); *C25D 5/34* (2013.01); *C25D 7/00* (2013.01); *C25D 17/16* (2013.01); *B22F 2301/10* (2013.01)

(58) Field of Classification Search
USPC ................ 228/179.1–180.22, 245–246, 56.3
See application file for complete search history.

(56) References Cited

U.S. PATENT DOCUMENTS

| | | | | |
|---|---|---|---|---|
| 7,625,420 | B1* | 12/2009 | Kodas | B01J 2/003 106/287.18 |
| 2006/0185474 | A1* | 8/2006 | Yamada | B22F 1/0011 75/255 |
| 2006/0186544 | A1* | 8/2006 | Won | H01L 24/45 257/741 |
| 2008/0042111 | A1* | 2/2008 | Sakaue | B22F 1/025 252/520.1 |
| 2009/0272466 | A1* | 11/2009 | Shindo | C22B 15/0089 148/432 |
| 2012/0240726 | A1 | 9/2012 | Kim et al. | |
| 2014/0346413 | A1* | 11/2014 | Inoue | H01B 1/026 252/514 |
| 2015/0197848 | A1* | 7/2015 | Suzuki | C23C 14/3407 204/298.13 |
| 2015/0217408 | A1* | 8/2015 | Kawasaki | C22C 12/00 174/126.2 |
| 2015/0313025 | A1* | 10/2015 | Kawasaki | B22F 1/02 403/272 |
| 2015/0336216 | A1* | 11/2015 | Hattori | H01L 21/4853 403/272 |
| 2016/0148885 | A1* | 5/2016 | Kawasaki | B23K 35/26 420/491 |
| 2016/0368105 | A1* | 12/2016 | Hattori | B22F 1/00 |
| 2017/0246711 | A1* | 8/2017 | Kawasaki | B23K 35/0244 |
| 2018/0015572 | A1* | 1/2018 | Kawasaki | B23K 1/00 |

FOREIGN PATENT DOCUMENTS

| | | | |
|---|---|---|---|
| CN | 103339719 | 10/2013 | |
| EP | 0 283 587 | 9/1988 | |
| JP | S63-211731 | 9/1988 | |
| JP | H05-036747 | 2/1993 | |
| JP | 2002-317211 | 10/2002 | |
| JP | 2005-036301 | 2/2005 | |
| JP | 2007-235091 | 9/2007 | |
| JP | 545182 | 3/2014 | |
| JP | WO 2014203348 A1 * | 12/2014 | ............ B23K 35/26 |
| SG | 191711 | 8/2013 | |
| WO | WO2015-118611 | 8/2015 | |

OTHER PUBLICATIONS

King et al. "Glow discharge Mass Spectrometry: Trace Element Determinations in Solid Samples" 1995.*

J. Hirota et al., "Concise Explanation of Relevance for Development of High Reliability Semiconductor Devices by Copper Wire Bonding", Bulletin of the Japan Institute of Metals, 1988, pp. 299, vol. 27.

J. Hirota et al., "The Development of Copper Wire Bonding for Plastic Molded Semiconductor Packages", Quarterly Journal of the Japan Welding Society, 1986, pp. 119. vol. 4.

* cited by examiner

METAL PARTICLE AND METHOD FOR PRODUCING THE SAME, COVERED METAL PARTICLE, AND METAL POWDER

TECHNICAL FIELD

The present invention relates to a metal particle and a method for producing the same, a covered metal particle, and a metal powder.

BACKGROUND ART

With the development of small information devices, electronic components of integrated circuits and large-scale integrated circuits have been downsized at a fast pace. These electronic components include those having a large number of outer leads on side surfaces of the package, such as dual in-line packages (DIPs), quad flat packages (QFPs) and small outline packages (SOPS). These electronic components include pin-shaped connection terminals (outer leads) along their circumference, and the connection terminals and a substrate, or the like, are connected to each other via solder. Therefore, when the number of connection terminals to be provided along the circumference increases due to integration, the size of the package increases, making it difficult to improve the mounting density.

In response to these problems, mounting (BGA mounting) has been making progress in which connection terminals are provided using solder balls, which do not have small ball-shaped cores, solder-covered Cu core balls (covered metal particles), which have metal particles whose primary component is Cu (copper) as cores with the outermost surface thereof covered with a solder layer, etc. Researches are also being made for three-dimensional high-density mounting, such as package-on-packages (POPs) and multi-chip modules (MCMs), in which units to be connected are stacked together in the height direction, while connection terminals are provided using such solder balls or solder-covered Cu core balls. With such a BGA mounting or a three-dimensional high-density mounting, it is possible to significantly improve the mounting density while suppressing an increase in the size of the package.

In recent years, as the density and the performance have been increased with BGA mounting and three-dimensional high-density mounting, researches are being made for further decreasing the size of the connection terminal section, and there is a demand for further reducing the diameter of the solder ball or the solder-covered Cu core ball described above. However, simply reducing the diameter of such a solder ball or a solder-covered Cu ball decreases the area (the area of attachment) that contributes to the attachment of the connection terminal portion. When the contact area of the connection terminal portion is reduced, the electrical resistance (volume resistivity) increases, and the current density in the connection terminal portion increases even in an electric field of an equivalent level to a conventional level. Such an increase in the current density generates a void in a solder portion due to electromigration, and the void grows, thereby increasing the possibility of breaking the connection terminal portion. Moreover, the connection terminal portion exposed to a strong electric field generates heat due to the electrical resistance (volume resistivity) of itself to melt the solder portion, thereby increasing the possibility of a short-circuit failure in which the molten solder comes into contact with an adjacent connection terminal.

As one method for solving such a problem caused by an increase in the current density, focusing particularly on solder-covered Cu core balls, it has been under discussion to keep the hardness and the deformation resistance value of the metal particle to be the core each within a predetermined range to facilitate plastic deformation, and to increase the contact area by deforming the metal particle so as to flatten the metal particle when forming the connection terminal portion. Regarding metal particles suitable for such an application, Patent Document 1, for example, discloses a Cu ball (metal particle) produced by uniform droplet spray (hereinafter referred to as "UDS process"), wherein the purity by mass is 99.9% or more and 99.995% or less, the sphericity is 0.95 or more, and the Vickers hardness is 20 HV or more and 60 HV or less. The UDS process is a quench particle production process capable of efficiently producing metal particles having a high sphericity while stably suppressing variations in particle diameter, in which molten metal droplets are dripped successively and rapidly solidified. Patent Document 1 also states that an increase in purity suppresses miniaturization of the crystalline structure of the metal particles, thereby decreasing the hardness and decreasing the sphericity of the metal particles. Note that metal particles for use in connection terminals are required to have a high sphericity in order to suppress dislocation of metal particles and improve self-alignment thereof when connections are made through solder reflow, to reduce variations in the connection gap formed by metal particles, and to suppress cracking of connection terminals due to repeated shear stress.

For the decrease in sphericity due to an increase in purity, Patent Document 1 discloses ensuring a desirable sphericity by rapidly solidifying, using the UDS process, Cu balls of which the impurity (trace element) mass content is 0.005% (50 ppm) or more and the sum (Pb+Bi) of Pb (lead) and Bi (bismuth) is greater than or equal to a predetermined amount, and then desirably softening the Cu balls through an annealing process using a holding temperature of 700° C. Then, it is clearly stated that specifically, Cu balls with Cu at 99.995% or less, Pb+Bi at 27.0 ppm, a Vickers hardness of 67.5 HV and a sphericity of 0.991682 (see Comparative Example 2) were successfully turned, through an annealing process, into Cu balls with a Vickers hardness of 55.8 HV and a sphericity of 0.984764 (see Example 2). Note that it is stated that other impurities (trace elements) include Sn, Sb, Zn, As, Ag, Cd, Ni, Au, P, S, U, Th, etc., and that the method for analyzing the components of the metal particles is by the high-frequency inductively coupled plasma atomic emission spectroscopy (ICP-AES analysis).

CITATION LIST

Patent Literature

[Patent Document No. 1] Japanese Patent No. 5585751

SUMMARY OF INVENTION

Technical Problem

Cu balls of which the sphericity is ensured by controlling Pb+Bi at 27.0 ppm, selecting Pb and Bi from among all the impurities (trace elements), is subjected to an annealing process, which is not conventionally performed on a Cu material, to soften the Cu balls so that the Vickers hardness thereof falls within a desired range. However, performing an annealing process on a metal particle has a problem of decreasing the production efficiency and increasing the cost because of the process of removing the surface oxide film, which is formed to be thicker than normal, as well as the problem of decreasing the sphericity described above.

An object of the present invention is to provide a metal particle having a desirable sphericity and Vickers hardness as described above in Patent Document 1 without performing an annealing process, a method for producing the same, and a metal powder, which is a collection of such metal particles.

Solution to Problem

In an attempt to increase the mass content of the primary component (Cu) of a metal particle and desirably decrease the Vickers hardness thereof, the present inventor found that the problem set forth above can be solved by specifying trace elements from among many elements and appropriately determining the mass content thereof, using the glow discharge mass spectrometry (hereinafter referred to as "GDMS analysis") instead of conventional ICP-AES analysis, thus arriving at the present invention.

A metal particle according to an embodiment of the present invention has a particle diameter of 10 μm or more and 1000 μm or less and includes Cu and trace elements, wherein a Cu mass content as determined in GDMS analysis is over 99.995% and a total mass content of P and S is 3 ppm or more and 30 ppm or less.

The metal particle according to an embodiment of the present invention can be turned into a covered metal particle by covering the surface of the metal particle with an Ni layer. A covered metal particle according to an embodiment of the present invention is an Ni-covered Cu core ball having the metal particle according to an embodiment of the present invention as a core and an Ni layer on the outermost surface.

A covered metal particle can be obtained by covering the surface of the Ni layer with a solder layer. A covered metal particle according to another embodiment of the present invention is a solder-covered Cu core ball having any of the metal particles set forth above as a core, an Ni layer as an intermediate layer, and a solder layer on the outermost surface. A metal powder according to an embodiment of the present invention is a collection of any of metal particles or any of covered metal particles set forth above.

The metal particle according to an embodiment of the present invention can be produced by a production method including: a step a of producing a molten metal material by melting a metal material in a crucible, wherein a Cu mass content as determined in GDMS analysis of the metal material is over 99.995% and a total mass content of P and S of the metal material is 3 ppm or more and 30 ppm or less; a step b of applying a pressure of 0.05 MPa or more and 1.0 MPa or less to an inside of the crucible to drip the molten metal material through an orifice whose diameter is 5 μm or more and 1000 μm or less, thereby producing a molten metal droplet; and a step c of rapidly solidifying the molten metal droplet using an inert gas whose oxygen concentration is 1000 ppm or less, thereby producing a metal particle whose particle diameter is 10 μm or more and 1000 μm or less.

The production method according to the embodiment of the present invention preferably does not include a step of annealing the metal particle at a temperature of 700° C. or more after the step c.

Advantageous Effects of Invention

According to the present invention, it is possible to obtain a metal particle having a desirable sphericity and Vickers hardness with no annealing process performed. A metal powder is also provided, which is a collection of such metal particles.

DESCRIPTION OF EMBODIMENTS

A metal particle, a covered metal particle and a metal powder, and a method for producing the same according to an embodiment of the present invention will now be described with reference to the drawings, but the present invention is not limited to the embodiment illustrated below.

A metal particle according to an embodiment of the present invention has a particle diameter of 10 μm or more and 1000 μm or less and includes Cu (copper) and trace elements, wherein the Cu mass content as determined in GDMS analysis is over 99.995% and the total mass content of P (phosphorus) and S (sulfur), among other trace elements, is 3 ppm or more and 30 ppm or less. Therefore, assuming that P and S are the only elements, other than Cu, included in the metal particle, the Cu mass content of the metal particle is 99.9970% (P+S=30 ppm) or more and 99.9997% (P+S=3 ppm) or less. Note that a metal particle according to an embodiment of the present invention substantially contains other trace elements other than P and S because it is impossible, with the current state of the art, to prevent the metal particle from being contaminated with elements other than P and S. For example, likely contaminant elements include Pb, Bi, Sn, Sb, Zn, As, Ag, Cd, Ni, Au, U, Th, Si, Al, Cr, Se, Ca, Co, Mo, Fe, etc. It should be noted that although oxygen from surface oxidation is not a trace element included in the metal particle because it can be removed by an oxide coating remover, its influence is not negligible when the surface oxide layer is thick. A metal particle according to an embodiment of the present invention is not limited to the connection terminal application described above, but is also applicable to, for example, an application where it is mixed with a binder to obtain a paste, an application where it is mixed with a resin or a rubber to obtain a sheet, or an electrode application such as a plating process.

Figure 1:
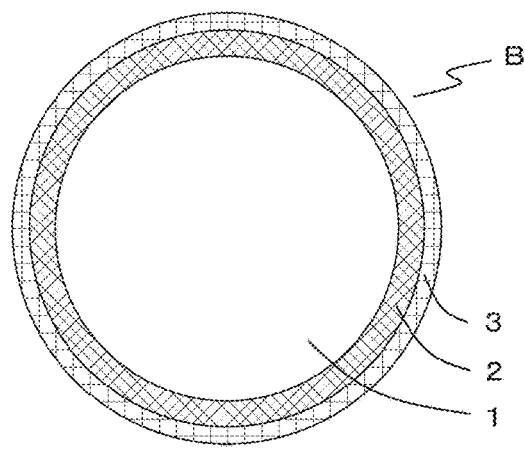
FIG. 1 A view showing an example configuration of a covered metal particle (solder-covered Cu core ball) having a metal particle according to an embodiment of the present invention as a core.

FIG. 1 shows an example configuration using a metal particle according to an embodiment of the present invention.

A solder-covered ball B is a solder-covered Cu core ball obtained by using a metal particle 1 according to an embodiment of the present invention as a core, covering the surface thereof with an Ni (nickel) layer 2 to obtain an Ni-covered metal particle, and further covering the surface of the Ni layer 2 with a solder layer 3 to obtain a solder-covered metal particle. The metal particle 1 to be the core has a particle diameter of 10 μm or more and 1000 μm or less and includes Cu and trace elements, wherein the Cu mass content as determined in GDMS analysis is over 99.995% and the total mass content (P+S) of P and S, among other trace elements, is 3 ppm or more and 30 ppm or less.

With the solder-covered ball B having the solder layer 3, the solder layer 3 can be heated into molten solder, and it is therefore easy to form connection terminals as described above, and the solder-covered ball B is convenient and preferable. The method for forming such a solder layer 3 on the surface of the metal particle 1 may be, for example, dipping in molten solder, electrolytic plating in a barrel, non-electrolytic plating using substitution reaction, etc. It is preferred to have the Ni layer 2 on the surface of the metal particle 1 as a base for the solder layer 3 including Sn (tin). If the solder layer 3 is directly on the surface of the metal particle 1 with no Ni layer 2 therebetween, Cu may elute from the metal particle 1 when the solder layer 3 becomes molten solder, thereby forming a CuSn alloy phase such as $Cu_3Sn$ or $Cu_6Sn_5$, for example. A connection terminal having such a CuSn alloy phase can easily harden and get brittle, and such a connection terminal is likely cracked or ruptured under an environment where the temperature changes repeatedly.

One characteristic of the metal particle 1 according to an embodiment of the present invention is that the Cu mass content of the metal particle 1 is over 99.995%. With a conventional metal particle of which the Cu mass content as determined in GDMS analysis is 99.995% or less, the surface crystalline structure is miniaturized due to the influence of contaminant trace elements, thereby increasing the sphericity and the hardness of the metal particle. It is believed that if the purity is so high that the Cu mass content is over 99.995%, as in the metal particle 1 of the present invention, the influence is reduced and the miniaturization of the crystalline structure is suppressed, though it may depend on the type and the content of the trace element. In view of this, when increasing the purity of the metal particle so that the Cu mass content is over 99.995%, it is important to select particular trace elements from among many elements and appropriately determine the mass content thereof so as to allow for an adequate miniaturization to achieve a desirable balance between sphericity and softness.

In view of the above, with the metal particle 1 according to an embodiment of the present invention, P and S are specified as trace elements, and the total mass content (P+S) of P and S is predetermined to be 3 ppm or more and 30 ppm or less. If P+S is 3 ppm or more and 30 ppm or less, when the metal particle 1 is formed, P and S can easily form aggregation nuclei to adequately miniaturize the surface structure. Therefore, the sphericity of the metal particle increases desirably while the hardness thereof is prevented from increasing excessively. As a result, with the metal particle, it is possible to obtain a desirable sphericity and surface hardness. Therefore, there is no longer a need for a conventional annealing process, which is performed for desirably softening a metal particle that has hardened excessively through rapid solidification. Note that if P+S is less than 3 ppm, aggregation nuclei are not formed sufficiently, and the sphericity of the metal particle is likely to decrease. If P+S is over 30 ppm, the miniaturization of the crystalline structure is not adequately suppressed, thereby increasing the surface roughness and reducing the sphericity, and the hardness of the metal particle is likely to increase.

When the Cu mass content of the metal particle 1 is over 99.995%, the mass content of other elements having a greater volume resistivity than that of Cu relatively decreases. Therefore, it is possible to decrease the volume resistivity of the metal particle 1 by the amount by which the mass content of elements having a higher volume resistivity than that of Cu is decreased. It is possible to obtain the metal particle 1 having a desired level of volume resistivity, e.g., $4.0\times10^{-5}$ Ωm or less, $3.0\times10^{-5}$ Ωm or less, $2.0\times10^{-5}$ Ωm or less or $1.0\times10^{-5}$ Ωm or less, etc., by appropriately adjusting the type and the content of the trace element, the metal particle producing conditions, etc. As a result, even in an electric field of an equivalent level to a conventional level, the increase in the current density is suppressed by the amount by which the volume resistivity of the metal particle 1 is decreased as compared with that of conventional techniques, thereby suppressing the generation of a void due to electromigration. Even when exposed to a strong electric field, the heat generation is suppressed by the amount by which the volume resistivity of the metal particle 1 is decreased as compared with that of conventional techniques, thereby suppressing the melting of the solder portion after connection. Such a metal particle 1 having a small volume resistivity is effective in suppressing the increase in the current density in a connection terminal of which the area of attachment is decreased because the size of the metal particle 1 is decreased by decreasing the diameter thereof.

When increasing the purity of the metal particle 1 described above, it is important to focus on the third decimal point of the mass content of Cu or those of trace elements of the metal particle 1, and it is important for the value of at least the third decimal point to be reliable, i.e., it is important to be able to analyze with a high precision. In view of this, according to the present invention, GDMS analysis is used in place of the conventional ICP-AES analysis. According to the principle of the GDMS analysis, a glow discharge is caused under an Ar (argon) atmosphere using a sample as a cathode, and the sample surface is sputtered in a plasma, measuring an ionized constituent element by a mass spectrometer. The measurement can be done for most elements (Li to U) having a stable isotope under the periodic law, and it is possible to measure the mass content of many elements on the order of ppb.

With the GDMS analysis, it is possible to measure chemical components contained in a metal material with a higher precision than the ICP-AES analysis. Specifically, the Cu mass content of the metal particle 1 can be measured with a resolution of 0.0001% (1 ppm) or less. Therefore, it is possible to provide the metal particle 1 with a high reliability by managing the chemical components of the metal particle 1 using measurement values obtained by the GDMS analysis. Note that since the GDMS analysis is performed under such a pressure that a glow discharge occurs using an Ar gas for the sputtering of the sample, the analysis is influenced by atmospheric elements, such as C (carbon), N (nitrogen) and O (oxygen), for example, that remain in the Ar gas, etc. Therefore, it is difficult to distinguish whether these elements are included in the sample or it is an influence of the background. Therefore, for the metal particle 1 using an element whose surface is easily oxidized, e.g., Cu, as a primary component, it is preferred to perform the GDMS analysis quickly after performing the process of removing the surface oxide layer of the sample (the metal particle 1).

The particle diameter of the metal particle 1 according to an embodiment of the present invention is 10 µm or more and 1000 µm or less, as described above. For example, when the metal particle 1 is used as the connection terminal portion described above, if the particle diameter of the metal particle 1 is 10 µm or more and 1000 µm or less, it is possible to increase the precision of the connection gap formed by the metal particle 1 or to reduce variations in the connection gap in a three-dimensional high-density mounting such as POP or MCM. Note that a particle diameter of less than 10 µm is not preferred because it is too small, making handling difficult and making it difficult to ensure positioning precision, thereby increasing the possibility that elements of the metal particle 1, such as Cu, diffuse into molten solder. A particle diameter of over 1000 µm is too large, possibly eliminating substantial advantages of size reduction realized by using a three-dimensional high-density mounting.

With the metal particle 1 according to an embodiment of the present invention, the purity is increased to be higher than that of a conventional Cu ball as described above (see Patent Document 1), and the metal particle 1 can have characteristics that are closer to those of pure Cu. Therefore, the metal particle 1 according to an embodiment of the present invention can have a Vickers hardness of 20 HV or more and 60 HV, equivalent to those of conventional techniques (see Patent Document 1). Therefore, the metal particle 1 according to an embodiment of the present invention can be used in a similar fashion to that of a conventional Cu ball for applications such as the connection terminal described above, and it can be expected to solve the problem of an increase in the current density for a BGA mounting or a three-dimensional high-density mounting.

Figure 2:
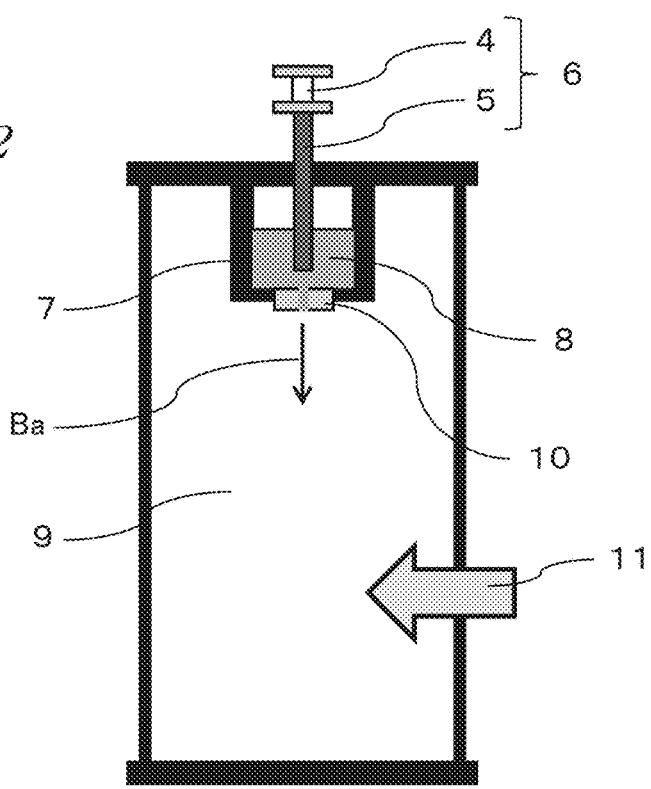
FIG. 2 A view showing an example configuration of a metal particle producing apparatus using a method for producing a metal particle according to an embodiment of the present invention.

Next, for the method for producing the metal particle 1 according to an embodiment of the present invention described above, an example configuration of a metal particle producing apparatus that employs this method is shown in FIG. 2 and will be described with reference to FIG. 2. A metal particle producing apparatus shown in FIG. 2 includes, as primary components thereof, a crucible 7 having an orifice 10 at the bottom thereof, an oscillation unit 6 including a piezoelectric element 4 and a rod 5, and a chamber 9 into which an inert gas can be introduced as indicated by arrow 11. Using such a metal particle producing apparatus, it is possible to produce a metal powder, which is a collection of metal particles 1.

(Step of Producing Molten Metal Material)

First, a metal material as the material of the metal particle 1 is put into the crucible 7 and heated to produce a molten metal material 8. The Cu mass content of the metal material as determined in GDMS analysis is over 99.995% and the total mass content of P and S, among other trace elements, is 3 ppm or more and 30 ppm or less, and the molten metal material 8 produced using the same has substantially the same components. Therefore, a metal particle to be produced in a later step can also have substantially the same components.

Note that the mass content of trace elements contained in the metal material is adjusted as follows, for example. The composition of pure copper used as a master ingot is determined in GDMS analysis. Trace elements themselves that are lacking in the master ingot are added to the master ingot or a copper alloy containing the lacking elements is added to the master ingot to achieve the target composition. Note that the composition of the copper alloy to be added to supplement the lacking elements is also determined in GDMS analysis in advance.

(Step of Producing Molten Metal Droplets)

Next, the molten metal material 8 is controlled within a predetermined temperature range inside the crucible 7 and a pressure of 0.05 MPa or more and 1.0 MPa or less is applied to the inside of the crucible 7 so as to drip the molten metal material 8 as indicated by arrow Ba through the orifice 10 whose diameter is 5 µm or more and 1000 µm or less, thereby producing ball-shaped molten metal droplets. Note that in FIG. 2, arrow Ba represents successively-dripped molten metal droplets for the sake of simplicity. In this process, the oscillation unit 6 is used to apply a predetermined periodic oscillation to the molten metal material 8 inside the crucible 7, thereby controlling each molten metal droplet to be a metal particle after solidification to a size corresponding to the oscillation period. Such a particle production method belongs to the UDS process.

The pressure to be applied to the inside of the crucible 7 (the applied pressure) is preferably controlled within a range of 0.05 MPa or more and 1.0 MPa or less, in which case it is possible to form ball-shaped molten metal droplets that are expected to have a high sphericity. When the applied pressure is less than 0.05 MPa, the influence of the friction of the molten metal material 8 passing through the orifice 10 increases, and the dripping of the molten metal material 8 from the orifice 10 likely becomes unstable, thereby increasing the variations in particle diameter of metal particles produced through solidification of molten metal droplets. When the applied pressure is over 1.0 MPa, a molten metal droplet dripping from the orifice 10 is likely formed in an ellipsoid-like ball shape, thereby decreasing the sphericity of metal particles produced through solidification of molten metal droplets.

The diameter of the orifice 10 is preferably set to an appropriate value while taking into consideration the particle diameter and the sphericity of metal particles to be produced and ranges over which the applied pressure and the oscillation period can be adjusted. Note that the diameter of the orifice 10 is the diameter of the opening of the nozzle through which the molten metal material 8 passes. For example, when the diameter of the orifice 10 is small, adjustments are made, e.g., by increasing the applied pressure and elongating the oscillation period, and when the diameter of the orifice 10 is large, opposite adjustments can be made. Note that the variations in particle diameter or sphericity of metal particles increase when the settings of the applied pressure or the oscillation period are excessively lopsided toward one side. Therefore, when producing metal particles of which the particle diameter is in the range of 10 µm or more and 1000 µm or less, the diameter of the orifice 10 is preferably set within the range of 5 µm or more and 1000 µm or less. The replacement of the orifice 10 can be done after each particle production process, but is difficult during one particle production process. Therefore, it is preferred to adjust other conditions, such as the applied pressure and the oscillation period, after setting the diameter of the orifice 10, which corresponds to the particle diameter of metal particles to be produced.

(Step of Producing Metal Particles)

Simultaneously with the progress of the step of producing molten metal droplets described above, the successively-dripped molten metal droplets represented by arrow Ba are rapidly solidified by a method such as blowing an inert gas whose oxygen concentration is 1000 ppm or less. By rapidly solidifying molten metal droplets as described above, it is possible to produce metal particles 1 having a particle diameter of 10 μm or more and 1000 μm or less and includes Cu and trace elements, wherein the Cu mass content as determined in GDMS analysis is over 99.995% and the total mass content of P and S, among other trace elements, is 3 ppm or more and 30 ppm or less.

The inert gas may be an argon gas, a nitrogen gas, or the like, which are non-oxidizing, and the oxygen concentration is 1000 ppm or less for any gas. If the oxygen concentration in the gas is increased, copper oxide is produced during the process of solidifying molten metal droplets, which becomes minute aggregation nuclei, thereby miniaturizing the solidified structure and forming a surface oxide layer on a metal particle, with an increased tendency for increasing the thickness thereof. If a thickness surface oxide layer is formed on a metal particle, a large amount of time is required for the process of removing the surface oxide layer, and there is a concern that there may occur problems relating to the particle diameter or the sphericity of the metal particle because of the removal process. When an Ni layer is formed on the surface of a metal particle having a surface oxide layer, there may occur poor adhesion of the Ni layer or a surface configuration (spots) where areas with no Ni layer coexist. With such problems, the Ni layer no longer functions as a barrier layer for preventing contact between the metal particle and the solder layer, thereby increasing the possibility that a CuSn alloy layer is formed as described above when the solder layer becomes molten solder. Therefore, according to an embodiment of the present invention, an inert gas whose oxygen concentration is 1000 ppm or less is used in order to suppress the formation of the surface oxide layer of the metal particle 1.

EXAMPLES

The embodiment of the present invention will now be described in greater details by way of examples. The embodiment of the present invention is not limited to the following examples.

Metal powders (the average particle diameter: 180 μm), which are collections of metal particles 1 (the target particle diameter: 180 μm) of the examples of the present invention according to the embodiment of the present invention, were produced using a metal particle producing apparatus shown in FIG. 2 employing the UDS process under predetermined production conditions (the applied pressure: 0.25 MPa, the temperature of the molten metal material 8: 1300° C., the inert gas: nitrogen gas, the oxygen concentration of the inert gas: 200 ppm, the pressure inside the chamber 9: 0.01 MPa, etc.). Metal powders, which are collections of metal particles according to the comparative examples, where the components of the molten metal material were varied, were produced in a similar fashion. The diameter of the orifice 10 corresponding to the particle diameter of the metal particle 1 was selected to be 30% to 90% of the particle diameter of the metal particle 1, for example, and then conditions such as the applied pressure were set and the oscillation period was adjusted so that a predetermined particle diameter is realized. Table 1 shows the analysis results of Cu, which is the primary component, and primary trace elements of metal particles 1 produced. Note that if an element was lower than the lower limit value of analysis, the element is denoted in Table 1 by the symbol (<) and the lower limit value for that element.

TABLE 1

| | | | Examples of present invention | | | | | Comparative example | | | | |
|---|---|---|---|---|---|---|---|---|---|---|---|---|
| Evaluated items | | | No. 1 GDMS analysis | No. 2 GDMS analysis | No. 3 GDMS analysis | No. 4 GDMS analysis | No. 5 GDMS analysis | No. 6 GDMS analysis | No. 7 GDMS analysis | No. 8 GDMS analysis | No. 9 GDMS analysis | No. 10 GDMS analysis |
| Metal particle | Cu | % | 99.9971 | 99.9964 | 99.9969 | 99.9972 | 99.9974 | 99.9938 | 99.9912 | 99.9874 | 99.9788 | 99.9623 |
| | P | ppm | 2.70 | 2.80 | 5.60 | 4.90 | 2.70 | 33.00 | 56.00 | 93.00 | 170.00 | 320.00 |
| | S | ppm | 9.30 | 8.00 | 9.90 | 7.00 | 8.20 | 5.50 | 5.30 | 4.30 | 4.10 | 5.00 |
| | P + S | ppm | 12.00 | 10.80 | 15.50 | 11.90 | 10.90 | 38.50 | 61.30 | 97.30 | 174.10 | 325.00 |
| | Pb | ppm | 0.03 | 0.20 | 0.47 | 0.18 | 0.12 | 0.08 | 0.14 | 0.18 | 0.38 | 0.46 |
| | Bi | ppm | 0.03 | 0.10 | 0.18 | 0.10 | 0.09 | 0.06 | 0.07 | 0.08 | 0.10 | 0.11 |
| | Sn | ppm | 0.08 | 5.00 | 0.07 | 0.06 | 0.04 | 0.09 | 0.18 | 0.15 | 0.18 | 0.47 |
| | Sb | ppm | 0.16 | 2.00 | 0.30 | 0.35 | 0.18 | 0.14 | 0.14 | 0.13 | 0.16 | 0.26 |
| | Zn | ppm | <0.05 | 0.14 | <0.05 | <0.05 | <0.05 | 0.05 | 0.2 | 0.22 | 0.56 | 0.27 |
| | As | ppm | 0.28 | 0.19 | 1.30 | 0.59 | 0.52 | 0.11 | 0.16 | 0.25 | 0.27 | 0.39 |
| | Ag | ppm | 14.00 | 13.00 | 8.90 | 12.00 | 12.00 | 19.00 | 19.00 | 18.00 | 17.00 | 15.00 |
| | Cd | ppm | 0.03 | 0.01 | 0.02 | 0.02 | 0.03 | <0.01 | <0.01 | <0.01 | <0.01 | <0.01 |
| | Ni | ppm | 0.35 | 2.20 | 0.95 | 0.85 | 0.54 | 0.38 | 0.35 | 0.49 | 0.87 | 1.20 |
| | Au | ppm | <0.05 | <0.05 | <0.05 | <0.05 | <0.05 | <0.05 | <0.05 | <0.05 | <0.05 | <0.05 |
| | U | ppm | <0.001 | <0.001 | <0.001 | <0.001 | <0.001 | <0.001 | <0.001 | <0.001 | <0.001 | <0.001 |
| | Th | ppm | <0.001 | <0.001 | <0.001 | <0.001 | <0.001 | <0.001 | <0.001 | <0.001 | <0.001 | <0.001 |
| | Si | ppm | 0.16 | 0.52 | 0.32 | 0.21 | 0.25 | 0.12 | 0.14 | 0.21 | 0.21 | 0.32 |
| | Al | ppm | 0.12 | 0.22 | 0.10 | 0.10 | 0.20 | 0.06 | 0.09 | 0.09 | 0.10 | 0.17 |
| | Cr | ppm | 0.05 | 0.04 | 0.12 | 0.13 | 0.16 | 0.01 | 0.02 | 0.03 | 0.03 | 0.05 |
| | Se | ppm | 0.08 | 0.22 | 0.98 | 0.19 | 0.26 | 0.21 | 0.24 | 0.15 | 0.14 | 0.20 |
| | Ca | ppm | 0.04 | 0.05 | 0.04 | 0.05 | 0.06 | 0.06 | 0.07 | 0.02 | 0.05 | 0.06 |
| | Co | ppm | <0.005 | 0.37 | 0.01 | 0.02 | 0.01 | 0.01 | 0.01 | 0.07 | 0.04 | 0.01 |
| | Mo | ppm | 0.02 | 0.05 | 0.19 | 0.05 | 0.06 | <0.005 | 0.01 | 0.02 | 0.22 | <0.005 |
| | Fe | ppm | 1.10 | 1.30 | 1.30 | 1.00 | 0.86 | 3.50 | 6.00 | 8.70 | 18.00 | 33.00 |

It was confirmed that with no annealing process performed, for any of metal particles of the examples of the present invention (Nos. 1 to 5) produced by the production method described above, the Cu mass content as determined in GDMS analysis was over 99.995% and P+S was within a range of 3 ppm or more and 30 ppm or less. On the other hand, it was confirmed that for any of the Cu balls of the comparative examples (Nos. 6 to 10), P+S was over 30 ppm.

(Particle Diameter, Sphericity)

The particle diameter and the sphericity were measured for metal particles of the examples of the present invention (Nos. 1 to 5) and those of the comparative examples (Nos. 6 to 10) with no annealing process performed. Specifically, a metal particle placed on a flat plate was irradiated with parallel light to form an image on a CCD using a telecentric lens so as to determine the area of the metal particle from the obtained image data. Then, the circle equivalent diameter was determined from the area of the metal particle. Note that the particle diameter of a metal particle, as used in the present invention, refers to this circle equivalent diameter. Then, the length ratio was determined by dividing the circle equivalent diameter by the maximum projection length, which is determined from the image data. Note that this length ratio is the sphericity of each metal particle. The sphericity of the metal particles of the examples of the present invention (Nos. 1 to 5) shown in Table 2 is the average value determined as the arithmetic mean of the sphericities of 500 metal particles as measured by the measurement method described above.

Figure 3:
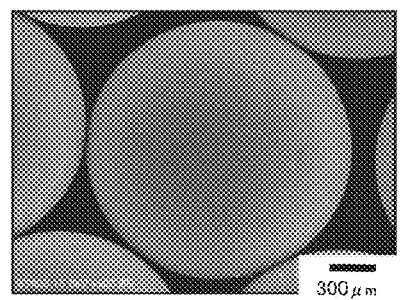
FIG. 3 An SEM surface image of a metal particle according to an example (No. 3) of the present invention.
Figure 4:
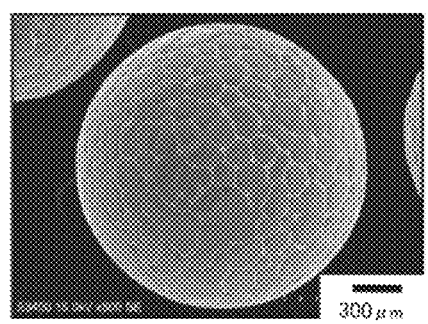
FIG. 4 An SEM surface image of a metal particle according to a comparative example (No. 6).
Figure 5:
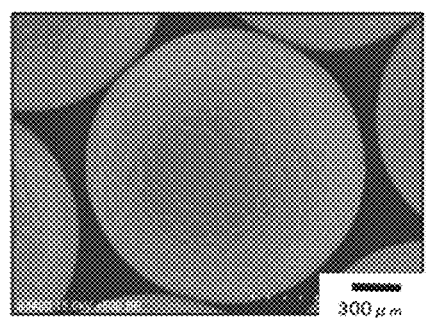
FIG. 5 An SEM surface image of a metal particle according to a comparative example (No. 9).

Table 2 shows sphericity. It was confirmed that the sphericities of the metal particles of the examples of the present invention were 0.9982 or more and 0.9987 or less. On the other hand, the sphericities of the metal particles of the comparative examples are 0.9973 or more and 0.9976 or less, indicating that the sphericity decreases when P+S is over 30 ppm. FIG. 3 to FIG. 5 show scanning electron microscope (SEM) surface images of a metal particle of the example of the present invention (No. 3) of which P+S is 15.5 ppm, a metal particle of the comparative example (No. 6) of which P+S is 38.5 ppm, and a metal particle of the comparative example (No. 9) of which P+S is 174.1 ppm. It can be seen that as P+S increases, crystal grains are miniaturized, deepening the trough of crystal grain boundary and pronouncing the surface irregularities.

TABLE 3

| Evaluated items | Examples of present invention | | Comparative examples | | | | |
|---|---|---|---|---|---|---|---|
| | No. 1 | No. 2 | No. 6 | No. 7 | No. 8 | No. 9 | No. 10 |
| Vickers hardness (HV) | 54.3 | 53.4 | 58.5 | 58.9 | 60.2 | 61.2 | 64.1 |
| Annealing process | None | None | None | None | None | None | None |

Figure 6:
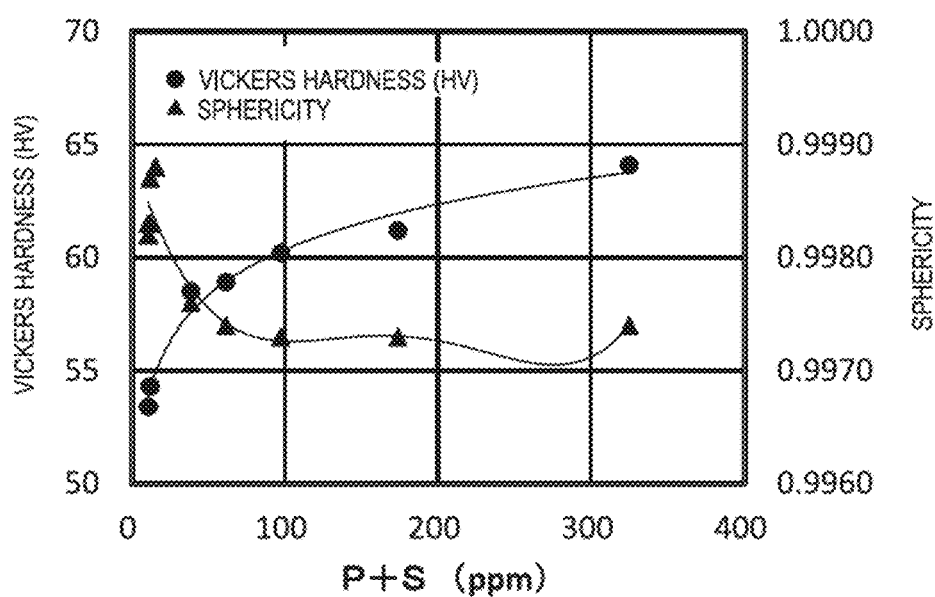
FIG. 6 A scatter plot with a horizontal axis representing the mass content of (P+S) and vertical axes representing the Vickers hardness and the sphericity, also showing a logarithmic approximation curve for the Vickers hardness and a quartic polynominal approximation curve for the sphericity.

FIG. 6 is a scatter plot for the examples of the present invention and the comparative examples, produced based on P+S shown in Table 1, the sphericity shown in Table 2 and the Vickers hardness shown in Table 3, also showing a logarithmic approximation curve for the Vickers hardness and a quartic polynominal approximation curve for the sphericity. The preferred content of P+S is 30 ppm or less when taking into consideration the tendency of change of the sphericity and the Vickers hardness with respect to the content of P+S shown in FIG. 6, in addition to the results of observing the surfaces of the metal particles shown in FIG. 3 to FIG. 5. Since sphericities of 0.9980 or more are more preferred, it can be said to be more preferred that P+S is 26 ppm or less. In this case, P+S can be determined based on the intersection between the straight line representing 0.9980 sphericity and the approximation curve for the sphericity in FIG. 6.

(Volume Resistivity)

Figure 7:
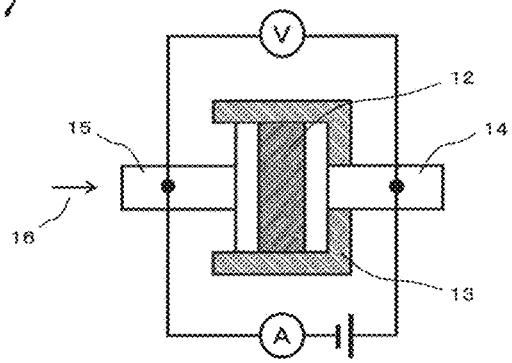
FIG. 7 A view showing a method for measuring the volume resistivity of a metal particle.

In addition, the volume resistivities of metal particles of the examples of the present invention (Nos. 1 and 2) with no annealing process performed were measured. Note that since it is difficult to accurately measure the volume resistivity of a single metal particle whose particle diameter is 180 μm, the volume resistivity (Rc) of a metal powder, which is a collection of metal particles, was determined by the measurement method shown in FIG. 7.

Specifically, a copper jig 14 is provided in a cylinder 13 having an inner diameter D, with 1.15 g of a metal powder

TABLE 2

| Evaluated items | Examples of present invention | | | | | Comparative examples | | | | |
|---|---|---|---|---|---|---|---|---|---|---|
| | No. 1 | No. 2 | No. 3 | No. 4 | No. 5 | No. 6 | No. 7 | No. 8 | No. 9 | No. 10 |
| Sphericity | 0.9983 | 0.9982 | 0.9988 | 0.9987 | 0.9983 | 0.9976 | 0.9974 | 0.9973 | 0.9973 | 0.9974 |
| Annealing process | None | None | None | None | None | None | None | None | None | None |

(Vickers Hardness)

The Vickers hardness was measured in conformity with the Vickers hardness test—test method (JIS-Z2244) for metal particles of the examples of the present invention (Nos. 1 and 2) and the comparative examples (Nos. 6 to 10) with no annealing process performed. Specifically, a metal particle to be the subject was buried in a resin and was polished to reach the substantially central portion of the metal particle to provide a smooth cross section (plane) so as to measure the Vickers hardness of that plane.

Table 3 shows the Vickers hardness. It was confirmed that the metal particles of the examples of the present invention were about 53 HV to about 55 HV, and were within a preferred range (20 HV to 60 HV), equivalent to that of the Cu ball described in Patent Document 1. On the other hand, as P+S increases, the Vickers hardness increases, and it was 60.2 HV or more for the comparative examples of No. 8 to No. 10.

12, which is a collection of metal particles, accommodated therein, and the interval L between the copper jig 14 and a copper piston 15 was held constant while a load of about 22 MPa was applied by the copper piston 15 in the direction of arrow 16 from the opening of the cylinder 13. Note that the copper jig 14 and the copper piston 15 were produced so that their resistance values were substantially the same. Then, an electric current was applied between the copper jig 14 and the copper piston 15, and the resistance value Rm was measured by using a commercial resistance meter (Resistance Meter 3541 from Hioki E. E. Corporation). The volume resistivity Rc (Ωm) of the metal powder 12 was determined using the expression $Rc=(Rm-Rj)\times\pi\times(D/2)^2/L$ based on the overall resistance value Rm (Ω) measured as described above, the resistance value Rj (Ω) of the copper jig 14 and the copper piston 15, the inner diameter D (m) of the cylinder 13, and the interval L (m) between the copper jig 14 and the copper piston 15. In this specification, symbol "×" denotes multiplication.

Table 4 shows volume resistivities. Note that the volume resistivities shown in Table 4 are each an average value determined through a plurality of measurements using the measurement method described above. A metal particle having a volume resistivity of this level is desirable because problems are unlikely to occur due to heat generation from the connection terminal portion, etc., in the connection terminal application described above, for example. Particularly, the metal particle of Example No. 1 of the present invention having a volume resistivity of $1.0 \times 10^{-5}$ Ωm or less is expected to realize advantageous functions and effects in many applications.

TABLE 4

| | Examples of present invention | |
|---|---|---|
| Evaluated items | No. 1 | No. 2 |
| Volume resistivity (×$10^{-5}$ Ωm) | 0.81 | 3.68 |
| Deformation resistance value (mN) (at 2% displacement) | 222 | 232 |
| Annealing process | None | None |

Figure 8:
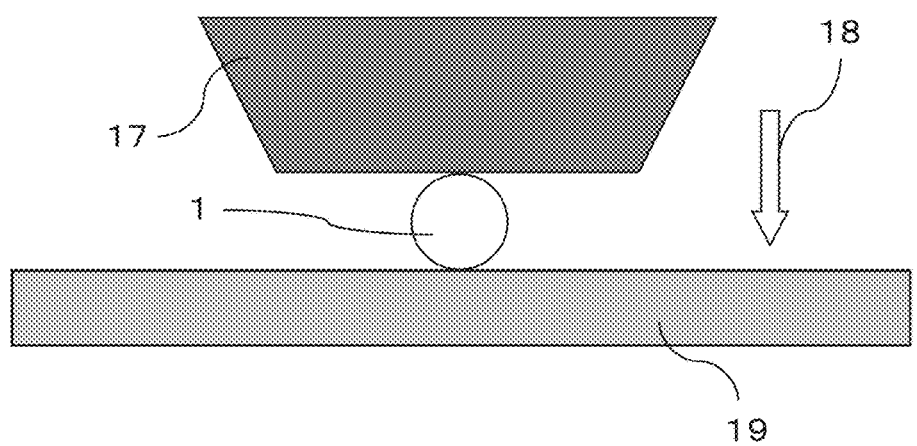
FIG. 8 A view showing a method for measuring the deformation resistance value of a metal particle.

The deformation resistance values at 2% displacement of the metal particles of the examples of the present invention (Nos. 1 and 2) with no annealing process performed were measured by the measurement method shown in FIG. 8 using a micro-compression testing machine (MCTM-500) from Shimadzu Corporation. Specifically, a metal particle placed on a flat plate 19 of an alloy tool steel (SKS) was clamped by a trapezoidal diamond pad 17 at room temperature (20° C. to 25° C.), and the force (pressurization force) was determined when moving the pad 17 over 3.6 μm at 207 mm/s (rate of compression) in the direction indicated by arrow 18. In this case, since the compression deformation of the metal particle whose particle diameter is 180 μm is 2% (3.6 μm/180 μm×100(%)), the pressurization force at this point was defined as the deformation resistance value of the metal particle at 2% displacement under normal temperature. A metal particle having a deformation resistance value of this level can easily be plastically deformed through pressurization, and it is therefore expected to realize advantageous functions and effects for increasing the contact area of the connection terminal portion in the connection terminal application described above, for example.

(Ni-Covered Metal Particle)

Next, using the metal particle 1 according to an embodiment of the present invention produced by the method described above as a core, an Ni-covered metal particle was produced, with the Ni layer 2 on the surface of the metal particle 1. Specifically, first, the metal particles 1 were put into a 10% hydrochloric acid aqueous solution at room temperature (20° C. to 25° C.) and stirred as necessary so as to remove the oxide coating formed through natural oxidation on the surface of the metal particles 1. Then, using an Ni electrode as the anode and setting the current density to 1.0 A/dm$^2$, the Ni layer 2 was formed on the surface of the metal particle 1 through Ni plating performed by means of a barrel plating apparatus using an Ni plating solution at a liquid temperature of 60° C. containing Ni sulfate and Ni chloride.

(Solder-Covered Metal Particle)

Then, using Ni-covered metal particles produced by the method described above, solder-covered metal particles (solder-covered balls B) having the solder layer 3 on the surface of the Ni-covered metal particles were produced. Specifically, with a cathode provided in a peripheral portion and an anode provided in a central portion inside the plating bath, a solder plating solution in the plating bath with Ni-covered metal particles therein, whose surface has been cleaned, was spun horizontally about a vertical axis so as to bring the Ni-covered metal particles into electric contact with the cathode through the horizontal spinning, thereby performing solder plating, forming the solder layer 3 on the surface of the Ni-covered metal particles. In this process, for the plating solution and the plating bath, the number of horizontal revolutions was selected within a range of 50 rpm or more and 800 rpm or less and the current density was selected within a range of 0.01 A/dm$^2$ or more and 5 A/dm$^2$ or less, and a control was performed so as to apply an electric current keeping the horizontal spinning at a constant speed. Note that the plating solution was an aqueous solution containing Sn methanesulfonate, Ag methanesulfonate, Cu methanesulfonate and a pH adjusting agent, etc.

Figure 9:
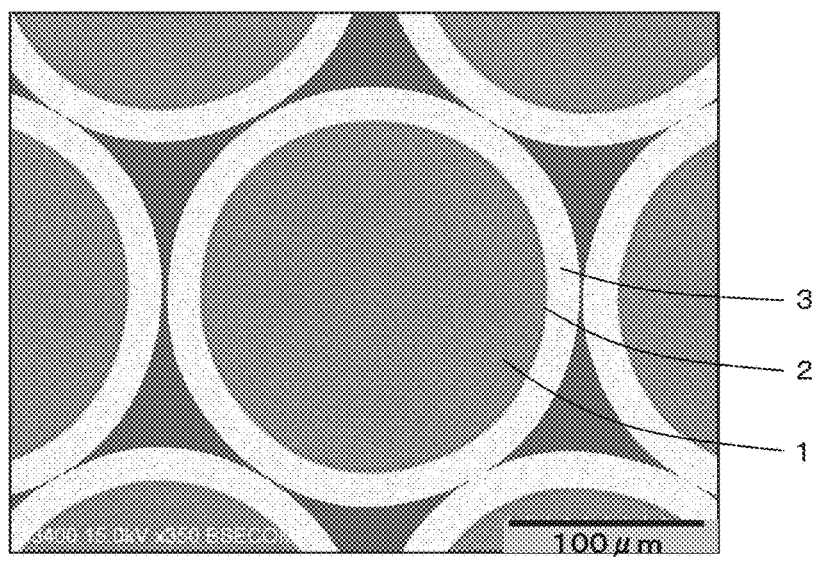
FIG. 9 An SEM cross-sectional image of a covered metal particle (solder-covered Cu core ball) having a metal particle according to an embodiment of the present invention as a core, an Ni layer as an intermediate layer, and a solder layer on the outermost surface.
Figure 10:
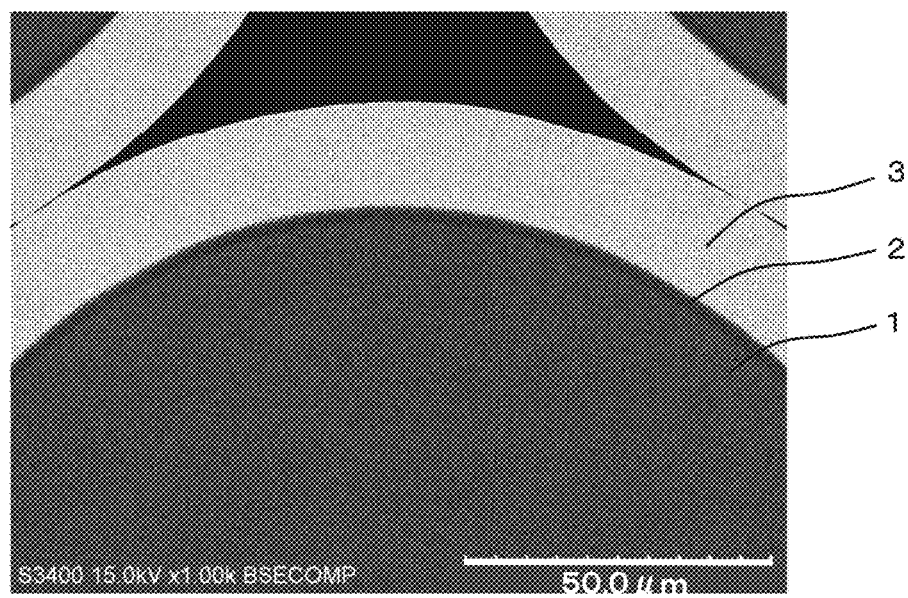
FIG. 10 An enlarged SEM cross-sectional image of a portion of the covered metal particle (solder-covered Cu core ball) shown in FIG. 9.

FIG. 9 shows an SEM cross-sectional image of solder-covered metal particles (solder-covered balls B) produced by the method described above, and FIG. 10 shows an enlarged SEM cross-sectional image of a portion thereof. These images confirmed that the solder-covered metal particles were such that the particle diameter of the metal particle 1 as the core was 179.9 μm, the thickness of the Ni layer 2 was 2.2 μm, and the thickness of the solder layer 3 was 17.8 μm.

INDUSTRIAL APPLICABILITY

The present invention suitable for use in metal particles and covered metal particles for connection terminal applications, such as BGA mounting and three-dimensional high-density mounting, for example, and also for use in a method for producing the same.

REFERENCE SIGNS LIST

1: Metal particle, 2: Ni layer, 3: Solder layer, 4: Piezo-electric element, 5: Rod, 6: Oscillation unit, 7: Crucible, 8: Molten metal material, 9: Chamber, 10: Orifice, 11: Arrow, 12: Metal powder (collection of metal particles), 13: Cylinder, 14: Copper jig, 15: Copper piston, 16: Arrow (direction of load), 17: Pad, 18: Arrow (direction of pressurization), 19: Flat plate, B: Solder-covered ball, Ba: Arrow

The invention claimed is:

1. A method for producing a metal particle, the method comprising:
    a step a of producing a molten metal material by melting a metal material in a crucible, wherein a Cu mass content as determined in GDMS analysis of the metal material is over 99.995% and a total mass content of P and S of the metal material is 3 ppm or more and 30 ppm or less;
    a step b of applying a pressure of 0.05 MPa or more and 1.0 MPa or less to an inside of the crucible to drip the molten metal material through an orifice whose diameter is 5 μm or more and 1000 μm or less, thereby producing a molten metal droplet; and
    a step c of rapidly solidifying the molten metal droplet using an inert gas whose oxygen concentration is 1000 ppm or less, thereby producing a metal particle whose particle diameter is 10 μm or more and 1000 μm or less.

2. The method for producing a metal particle according to claim 1, not comprising a step of annealing the metal particle at a temperature of 700° C. or more after the step c.

3. The method for producing a metal particle according to claim 1, wherein the metal material includes Cu and trace elements including P and S.

* * * * *